Jan. 25, 1938.  F. W. BURGER  2,106,270
WHEEL
Filed Aug. 30, 1935  2 Sheets-Sheet 1

Inventor:
Frederick W. Burger

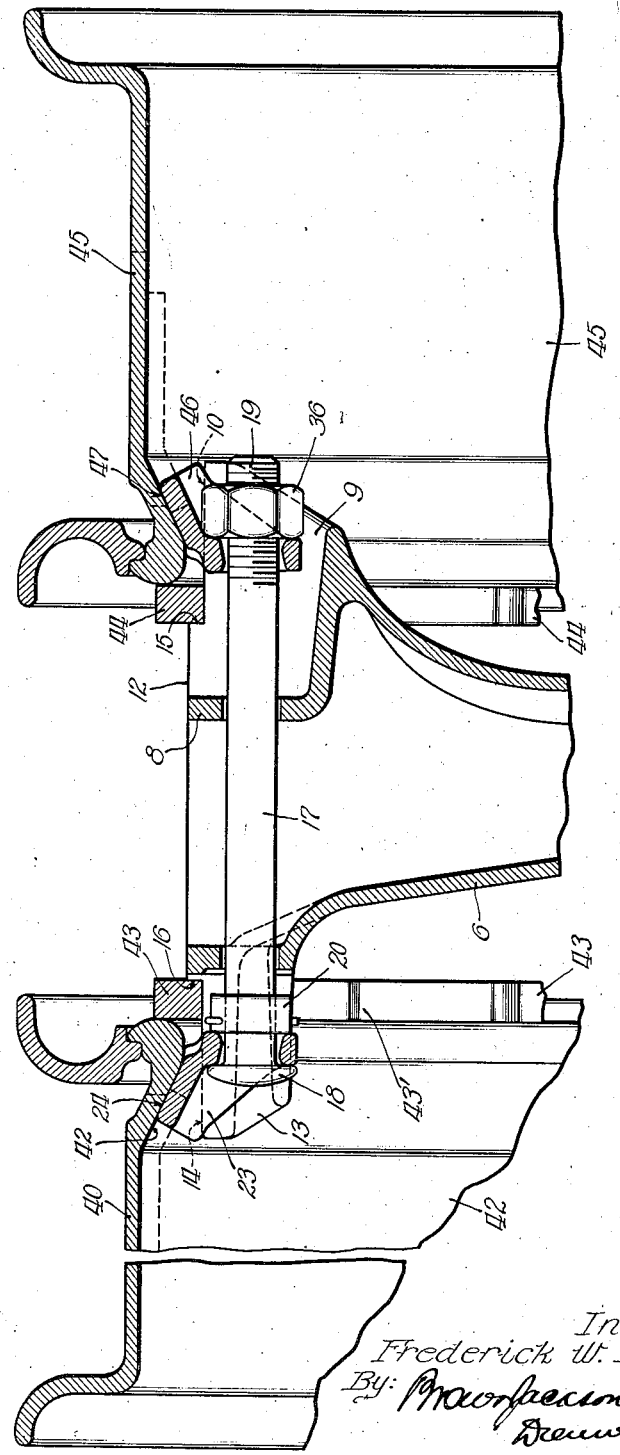

Patented Jan. 25, 1938

2,106,270

UNITED STATES PATENT OFFICE 2,106,270

WHEEL

Frederick W. Burger, Niles, Mich., assignor to Clark Equipment Company, Buchanan, Mich., a corporation of Michigan Application August 30, 1935, Serial No. 38,508

13 Claims. (Cl. 301—13)

This invention relates to wheels and more particularly is directed to a wheel construction of the metal spoke type, for mounting either a single tire rim or dual tire rims thereon.

It is a primary object of the present invention to provide a wheel spider having a plurality of radially extending hollow spokes, which spokes have at their outer ends suitable means for mounting either one or two tire rims in fixed lateral and radial positions thereon.

Another object of the present invention is to provide a wheel structure having demountable bevel seating surfaces at the outboard side of the spoke ends for mounting a single rim thereon, the rim being forced into fixed position by lug means pressing the rim into wedged engagement with the beveled seating surfaces.

One of the advantages secured by the present construction is the provision of mounting means whereby the center of thrust of the load on the wheel spider falls in substantially the same plane, irrespective of whether one or two tire rims are being used. This plane, preferably, is between the wheel bearings at the hub of the wheel. Thus, with a single rim mounted on the wheel, the rim is supported in inwardly extending position at the lateral outer surface of the wheel spider, while with a dual wheel construction the two rims are supported in outwardly extending positions at laterally spaced points on the spoke ends.

Another feature provided by the present invention is the provision of a spoke end construction in which the bolt for drawing up the clamping lugs need not be removed in changing from a single to a dual wheel construction, or vice versa, and the bolt is provided with a double-walled support in both constructions, so as to be retained in proper position during assembling of the rims on the spider.

Another object of the present invention is to provide a wheel construction in which both rims may be assembled from the outboard side of the vehicle when a dual wheel construction is desired, and suitable spacing means may be interposed between the rims to insure positive lateral spacing of the two rims previous to drawing up of the clamping means.

Another advantage secured by the present invention is the provision of means permanently carried by the clamping bolt for holding the inboard clamping lug in fixed position when the structure is used for a single rim mounting, to prevent it from rattling or moving out of position.

Another feature of this construction is the provision of a beveled clamping member which at its inner surface abuts against a shoulder formed integral with the spoke end of the wheel body, and which provides a demountable beveled clamping surface for forcing the rim into positive lateral and radial alignment when a single rim mounting is employed.

Other objects and advantages of the present invention will appear more fully from the following detailed description, which, taken in conjunction with the accompanying drawings, will disclose to those skilled in the art the particular construction and operation of a preferred form of the present invention.

In the drawings:

Figure 2 is a corresponding view showing a double rim mounting, and

Figures 1, 3:
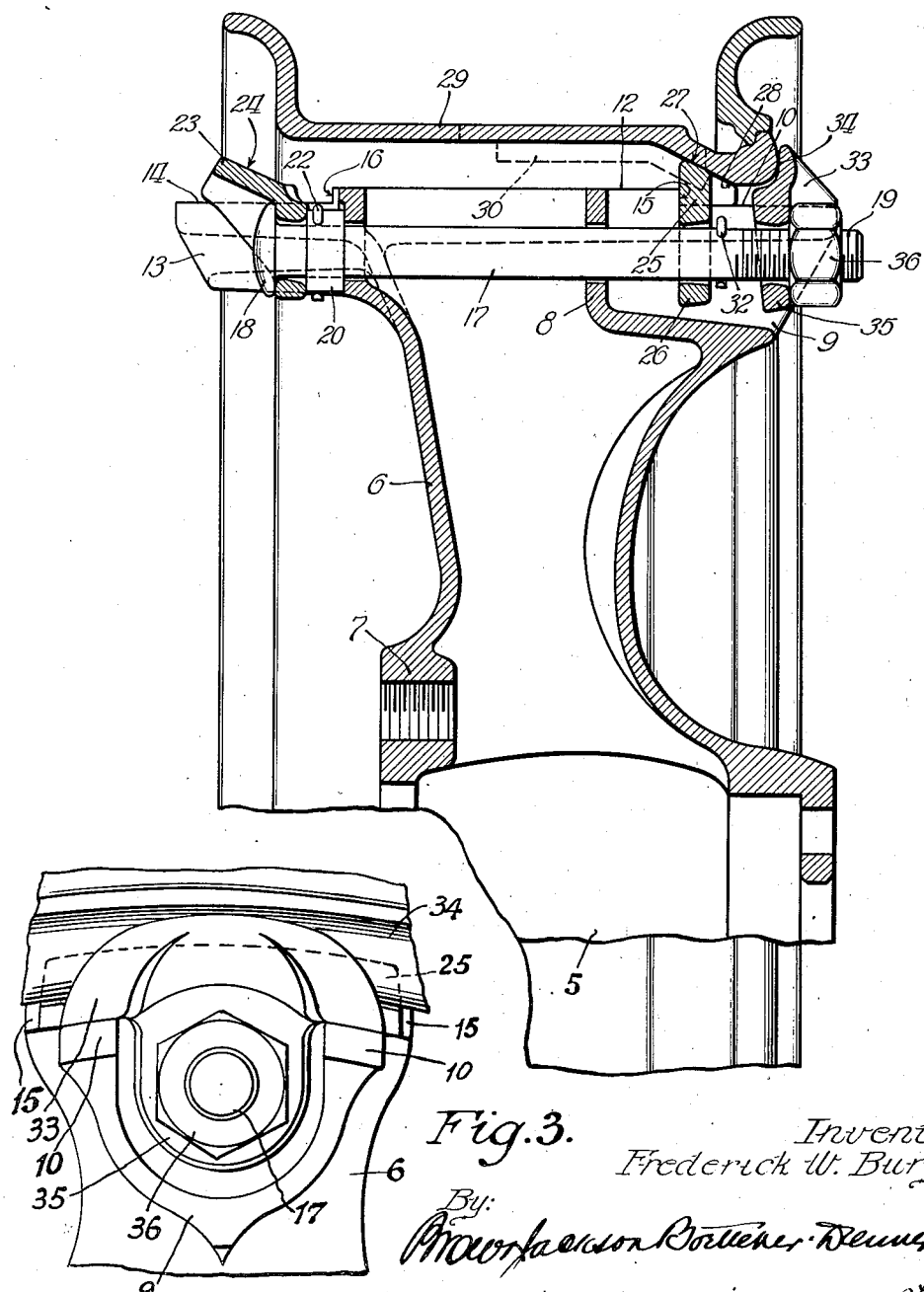
Figure 1 is a sectional view through one spoke member of the wheel body showing the construction employed for a single rim mounting.
Figure 3 is an end elevational view of the spoke shown in Figure 1.

Referring now in more detail to the drawings, I provide a wheel body 5 having a central hub portion adapted to receive the usual type of wheel bearings for mounting the spider upon an axle or the like and provided with a plurality of laterally extending spokes 6, preferably formed as hollow spoke members provided with open ends. At the rear of each of the spokes 6 and closely adjacent the hub of the wheel spider, I provide a plurality of bosses 7 which are suitably tapped to receive bolt means for securing a brake drum or the like thereto.

The outer ends of the spokes 6 are provided with an integral radially extending transverse wall 8 which forms, with the laterally extending pair of spaced parallel walls, a laterally and outwardly opening socket at each of the spoke ends, the socket being provided with spaced seating surfaces or shoulders 10 disposed radially inwardly of the outer end 12 of the spokes. At the inboard side of each spoke end I provide a pair of laterally extending parallel walls 13 which have seating surfaces or shoulders 14 formed at the outer edge thereof, and disposed radially inwardly of the central portion 12 of the spoke end. By thus disposing the seating surfaces 10 and 14 I provide a pair of abutment surfaces 15 and 16 extending radially outwardly at the inner ends of each of the sockets formed at opposite sides of the spoke ends.

The rear defining wall of the spoke 6 and the intermediate wall 8 are suitably apertured to receive a clamping bolt 17 having an enlarged head portion 18 and a threaded end portion 19 extending outwardly of the outboard socket. The bolt 17, adjacent the head 18, is adapted to receive a collar 20 keyed thereto by the pin 22 whereby the shank of the clamping lug 23 is secured in fixed longitudinal position between the head end 18 of the bolt and the collar 20.

The clamping lug 23 is similar to that disclosed in my copending application, Serial No. 717,116, filed March 23, 1934. It comprises a pair of laterally extending shoulders having riding engagement upon the seating surfaces 14 for guiding the lug axially inwardly of the wheel body at the spoke end. The lug is also provided with a beveled wedge surface 24 for engaging the beveled gutter of the tire rim. Its operation will be described in more detail in connection with Figure 2.

Within the outer socket and extending outwardly of the spoke end, I provide an auxiliary demountable beveled clamp member 25 having a shank portion 26 freely engaging about the bolt 17 within the socket, and provided with a beveled clamping surface 27 extending across and supported on the laterally spaced shoulders 10. The surface 27 is adapted to be engaged by the corresponding beveled surface 28 of the tire rim 29, which is adapted to have suitable driving lugs 30 providing abutting engagement with the sides of the clamping members 26 to provide for conjoint rotation of the rim and wheel body. The member 26 is retained in position on the bolt 17 by means of the cotter key 32.

In order to chord the rim 29 into fixed lateral and radial position with respect to the wheel body, I provide the clamping lugs 33 having radial lip portions 34 engaging the lateral edge of the rim 29 and having depending shank portions 35 engaged by the bolt 17. A suitable clamp nut 36 is provided for each bolt for forcing the corresponding lug 33 inwardly on the shoulders 10 to move the rim 29 laterally inwardly of the wheel body whereupon it is radially chorded into position by engagement between the surfaces 27 and 28.

It will be noted that when the rim has been clamped in fixed position, the bolt 17 will be so positioned that the head end 18 thereon will hold the lug 23 in fixed position so that it does not rattle or become displaced out of position during operation of the vehicle. At the same time, the inwardly extending portion of the rim 29 overhangs the wheel spider so that the vertical thrust will be transmitted to the wheel body substantially through the central plane thereof, thus providing the desired load carrying position.

In changing from the single rim mounting shown in Figure 1 to the dual rim mounting shown in Figure 2, it is only necessary to remove the nut 36, the lug 33, and thus dismount the rim 29 from the wheel. The cotter key 32 is then removed and the member 26 is displaced outwardly from the bolt 17. A tire rim, such as the rim 40 shown in Figure 2, and corresponding to the rim 29, is then moved laterally over the wheel body from the outboard to the inboard side thereof until the internal beveled gutter surface 42 thereof engages the surface 24 of the lug 23. A suitable spacing ring 43 which is provided about its inner periphery with a plurality of notched out portions 43', corresponding to the spacing rings shown in detail in my copending application, Serial No. 5,520, filed February 8, 1935, is passed laterally over the wheel body into a position inwardly of the shoulder 16. The ring 43 is then rotated into position to ride inwardly on the shoulders 14 into abutting engagement with the shoulder 16 which provides a fixed abutment for the lateral inner face of the ring 43. The ring is thus restrained from displacement laterally of the shoulder 16, and serves as an abutment for the rim 40.

A corresponding spacing ring 44 is then positioned over the outwardly extending shoulders 10 and moved into abutting engagement with the abutments 15 formed at the edge of the spoke ends. A second tire rim 45 is then moved into lateral abutting engagement with the ring 44 and a second lug 46 corresponding in structure and function to lug 23 is mounted upon the end 19 of the bolt 17, and moved inwardly to provide for wedging engagement of the surface 47 thereof with the beveled gutter surface of the rim 45. The lug 46 is provided with laterally spaced shoulders which have riding engagement on the surfaces 10 of the socket whereby upon tightening of the nut 36 upon the bolt, the head end 18 of the bolt is drawn axially inwardly to chord the rim 40 into fixed position, while at the same time the lug 46 is moved inwardly of the bolt to chord the rim 45 into fixed position. The load on the rims 40 and 45 is thus transmitted through the beveled wedge surfaces to the wheel body at substantially equally spaced points so that the resultant thrust is transmitted to the wheel bearings substantially through the central plane of the wheel body.

Suitable driving lug means, carried by each of the rims 40 and 45, can be employed for abutting engagement with the sides of the lugs 23 and 46 to provide for conjoint rotation between the rims and the wheel body.

It is therefore apparent that I have provided a wheel construction in which a single bolt means is employed for single or dual rim mounting and the bolt means need not be displaced from the wheel body in changing from one to the other of the mountings. Also, the present construction readily adapts itself to the assembling of both of the tire rims from the outboard side of the vehicle, which is of distinct advantage.

It will be noted that the lateral thickness of the spacing ring 43 is sufficient to prevent engagement of the collar 20 with the lateral inner face of the spoke end during tightening of the lugs into rim supporting position.

I do not intend to be limited to the exact details of the construction which I have shown and described, as these may be widely varied without departing from the underlying principles of the present invention, and I therefore intend to limit myself only as defined by the scope and spirit of the appended claims.

I claim:

1. In combination, a wheel spider having a plurality of radially extending spokes, a pair of oppositely extending sockets at the ends of each of said spokes, a bolt having double-walled support in said spoke end and having clamping lugs carried at its ends within said sockets and outwardly of said support, and a collar on said bolt for holding one of said lugs in fixed position on said spoke end when only a single rim is mounted on said wheel spider.

2. A wheel adapted for either single or dual rim mounting comprising a wheel spider having radially extending spokes, a pair of spaced transverse walls at the ends of each of said spokes, a bolt supported in said walls and extending axially outwardly of said spoke end at opposite sides thereof, a head at one end of said bolt, a clamping lug carried by said bolt, and collar means secured to said bolt for holding said lug against said head and for preventing rattling of said lug when a single rim is mounted on the spider adjacent the opposite end of the bolt.

3. A wheel adapted for either single or dual rim mounting, comprising a wheel spider having radially extending spokes, a bolt extending axially through the end of each spoke, a head at one end of said bolt, a clamping lug mounted on said bolt adjacent said head, a collar on said bolt externally of said spoke end for preventing substantial relative movement between said lug and said head, a second clamping lug on the opposite end of said spoke, and means for simultaneously drawing said lugs toward each other.

4. A wheel comprising a wheel spider having radially extending spokes, a bolt passing axially through the end of each spoke, a head at one end of said bolt, means on said bolt including a clamping lug adjacent said head and locking means securing the same against said head for conjoint longitudinal movement with said bolt, a clamping member at the other end of said bolt slidable thereon, a shoulder on said spoke end for limiting lateral inward movement of said member, a tire rim engaging said member, and lug means on said bolt engaging a lateral edge of said rim for urging said rim laterally inwardly and radially outwardly with respect to said clamping member, said first lug being held against movement relative to said bolt and said spoke end by said locking means when the rim is clamped in position.

5. A wheel adapted for either single or dual rim mounting comprising a wheel spider having radially extending hollow spokes, the ends of each of said spokes being provided with axially outwardly extending spaced transverse walls, laterally extending parallel seating surfaces at the radial outer edges of each of said walls, radially outwardly extending abutments at the adjacent ends of each pair of said seating surfaces, a headed bolt supported axially between said transverse walls, lug means at each end of said bolt and guided on said surfaces for mounting tire rims on said spider, and means secured to said bolt for holding one of said lug means against longitudinal movement with respect to said bolt, and engaging the bolt support when a single rim is mounted on said spider.

6. In combination, a wheel body having a plurality of hollow radially extending spokes, a bolt extending axially across the outer end of each spoke, spaced walls extending outwardly on opposite sides of each end of said bolt, a collar carried by said bolt adjacent the head end thereof and adapted to be drawn against the side of said spoke end, a clamping lug having lateral shoulders guided for axial movement on said walls and having a shank portion engaging about said bolt between the head end thereof and said collar, and means at the opposite end of said bolt for drawing said head end axially inwardly toward said spoke end to lock said lug in fixed position.

7. In combination, a wheel body having radially extending spokes, a pair of oppositely extending laterally opening sockets at the end of each of said spokes, a bolt extending axially through said sockets and supported in said spoke end, a head on one end of said bolt, a collar on said bolt adjacent said head, a clamping lug having guided engagement in one of said sockets and having its shank engaging said bolt between said head and said collar, a clamp member carried on said bolt and having support in said other socket, radial abutment means on said spoke end for limiting axial inward movement of said member, a rim having an internal bead engaging said member, and lug means on said bolt engaging the lateral side of said rim adjacent said bead for wedging said bead into chorded engagement with said member, said collar being simultaneously urged against the inboard side of said spoke end to prevent rattling of said lug.

8. The combination with a spoke end having a lateral outwardly opening socket defined by parallel spaced laterally extending walls having radially outwardly extending abutment shoulders thereon, of a rim seating member having a frusto-conical inwardly tapered outer surface, a radially extending inner face engaging said shoulders, a depending shank on said member having its inner face parallel with the inner radially extending face of said member, and laterally outwardly extending shoulders riding on the outer defining edges of said walls and forming a continuation of the tapered surface of said member.

9. In combination, a wheel spider having extending spokes, spaced transverse walls at the ends of each of said spokes, a clamping bolt extending axially through and supported in each of said walls, lug means on said bolt disposed outwardly of said walls, radially extending abutment shoulders disposed outwardly of said walls, spacing rings engaging said shoulders, and a collar keyed to said bolt for confining one of said lug means against longitudinal movement with respect to said bolt, the spacing ring laterally spacing said collar away from the adjacent wall when a pair of tire rims are secured by said lug means to said spider, said collar abutting against said wall to hold the associated lug means from rattling when only a single rim is secured by the opposite lug means to the spider.

10. In combination, a wheel spider having extending spokes, each of said spokes terminating at its outer ends in transverse radially extending parallel spaced walls, a clamping bolt extending through both said walls, parallel spaced seating shoulders extending outwardly from each of said walls, clamping lug members having laterally spaced seating portions riding axially inwardly on said shoulders, said lug members having radially inwardly extending apertured shanks engaged by said bolt, a collar keyed to said bolt and confining one of said shanks between the bolt head and said collar, said collar abutting against the outer radial surface of one of said walls when a single rim is supported on said spider by the lug member at the opposite end of the bolt to limit axial movement of said bolt in one direction and to hold the associated lug member against rattling.

11. The combination, in a wheel spider having extending spokes terminating at their outer ends in laterally spaced radially extending transverse walls, of a clamping bolt extending through both of said walls, lug means at opposite ends of said bolt, a collar keyed to said bolt adjacent the head end thereof for holding one of said lug means against longitudinal movement along said bolt, and means at the opposite end of said bolt for moving the adjacent lugs means longitudinally along the bolt and simultaneously moving said bolt in the opposite direction to clamp said collar against the adjacent one of said walls to hold said one of said lug means against rattling when not engaged by a tire rim.

12. In combination, a wheel spider having free spoke ends, a bolt extending transversely through each spoke end, a rim seating member carried by said bolt and adapted to receive a bead-mounted tire rim, a radial abutment limiting lateral movement of said member, lug means at opposite ends of said bolt, locking means securing the lug means remote from said member against longitudinal movement along said bolt, means for forcing the other lug means laterally toward said member to wedge the rim thereon and simultaneously clamping said locking means and the associated lug means against the spoke end to prevent any rattling thereof.

13. A clamping bolt assembly for a wheel spider having free spoke ends and adapted for mounting either one or two tire rims thereon comprising a clamping bolt extending transversely through said spoke end, a head on one end of said bolt, a clamping lug on said bolt adjacent said head, means secured to said bolt preventing longitudinal movement of said lug, a clamping member adapted to be secured on said bolt adjacent the opposite end thereof when a single rim is to be mounted on said spider, associated clamping means for engaging the rim with said member carried by the bolt outwardly of said member, and means on said bolt drawing said lug into locked position on said spoke end and simultaneously moving said clamping means toward said clamping member.

FREDERICK W. BURGER.